US012353625B1

(12) United States Patent
Gonzalez et al.

(10) Patent No.: US 12,353,625 B1
(45) Date of Patent: Jul. 8, 2025

(54) ESTIMATION OR CONTROL OF CONTACT FORCE IN ACTUATORS USING PRESSURE

(71) Applicant: META PLATFORMS, INC., Menlo Park, CA (US)

(72) Inventors: Eric Jordan Gonzalez, Stanford, CA (US); Amirhossein Hajiagha Memar, Woodinville, WA (US); Nicholas Colonnese, Kirkland, WA (US)

(73) Assignee: Meta Platforms, Inc., Menlo Park, CA (US)

( * ) Notice: Subject to any disclaimer, the term of this patent is extended or adjusted under 35 U.S.C. 154(b) by 375 days.

(21) Appl. No.: 17/696,771

(22) Filed: Mar. 16, 2022

(51) Int. Cl.
*G06F 3/01* (2006.01)
*G08B 6/00* (2006.01)

(52) U.S. Cl.
CPC .............. *G06F 3/016* (2013.01); *G06F 3/011* (2013.01); *G08B 6/00* (2013.01)

(58) Field of Classification Search
CPC ............ G06F 3/016; G06F 3/011; G08B 6/00
See application file for complete search history.

(56) References Cited

U.S. PATENT DOCUMENTS

| | | | |
|---|---|---|---|
| 10,474,236 B1 | 11/2019 | Stewart et al. | |
| 10,488,932 B1 | 11/2019 | Keller et al. | |
| 11,132,061 B1 * | 9/2021 | Stanley | G06T 19/006 |
| 2018/0061191 A1 * | 3/2018 | Alghooneh | G06F 3/016 |
| 2019/0101141 A1 * | 4/2019 | Metschke | F15B 15/2815 |
| 2020/0250942 A1 * | 8/2020 | Young | A63F 13/285 |
| 2021/0081048 A1 | 3/2021 | Sedal et al. | |
| 2022/0373381 A1 * | 11/2022 | Hase | G01F 3/16 |

FOREIGN PATENT DOCUMENTS

JP 2021535500 A * 12/2021

OTHER PUBLICATIONS

Machine translation of JP2021535500A (Year: 2021).*
Azami O., et al., "External Force Estimation of Pneumatic Soft Actuator with Built-in Displacement Sensor," Sensors and Materials, 2021, vol. 33 No. 2, pp. 555-567.
Buso A., et al., "Soft Robotic Module for Sensing and Controlling Contact Force," IEEE International Conference on Soft Robotics, 2020, pp. 70-75.
Cheng N., et al., "Soft Fabric-Based Pneumatic Sensor for Bending Angles and Contact Force Detection," IEEE Sensors Journal, Feb. 15, 2019, vol. 19, No. 4, pp. 1269-1279.
Deimel R., et al., "Mass Control of Pneumatic Soft Continuum Actuators with Commodity Components," IEEE/RSJ International Conference on Intelligent Robots and Systems (IROS), 2016, pp. 774-779.
Stanley A.A., et al., "Lumped-Parameter Response Time Models for Pneumatic Circuit Dynamics," Journal of Dynamic Systems, Measurement, and Control, May 2021, vol. 143 No. 5, 11 pages.

(Continued)

*Primary Examiner* — Lee E Rodak
*Assistant Examiner* — Sangkyung Lee
(74) *Attorney, Agent, or Firm* — Morgan, Lewis & Bockius LLP (57) ABSTRACT

Methods, systems, and apparatuses for combining pressure measurement with a dynamic system model to estimate the air mass within an actuator, and then estimate the applied contact force which may be based on a quasi-static deformation model.

20 Claims, 8 Drawing Sheets

(56) References Cited

OTHER PUBLICATIONS

Tanaka Y., et al., "Wearable Haptic Display for Immersive Virtual Environment," Proceedings of the JFPS International Symposium on Fluid Power, Jan. 2002, vol. 2002, pp. 309-314.

Teeple C.B., et al., "Soft Curvature and Contact Force Sensors for Deep-Sea Grasping via Soft Optical Waveguides," IEEE/RSJ International Conference on Intelligent Robots and Systems (IROS), Oct. 2018, pp. 1621-1627.

Walker J., et al., "Soft Robotics: A Review of Recent Developments of Pneumatic Soft Actuators," Actuators, vol. 9, 2020, 26 pages.

Yang H., et al., "A Novel Pneumatic Soft Sensor for Measuring Contact Force and Curvature of a Soft Gripper"; Sensors and Actuators A: Physical, Oct. 2017, vol. 266, pp. 318-327.

Young E.M., et al., "Bellowband: A Pneumatic Wristband for Delivering Local Pressure and Vibration," IEEE World Haptics Conference (WHC), Jul. 2019, pp. 55-60.

Zhu M., et al.; "PneuSleeve: In-fabric Multimodal Actuation and Sensing in a Soft, Compact, and Expressive Haptic Sleeve," Proceedings of the 2020 CHI Conference on Human Factors in Computing Systems, Apr. 2020, 12 pages.

Zoller G., et al., "Acoustic Sensing for Soft Pneumatic Actuators," IEEE/RSJ International Conference on Intelligent Robots and Systems, 2018, pp. 6986-6991.

* cited by examiner

ESTIMATION OR CONTROL OF CONTACT FORCE IN ACTUATORS USING PRESSURE

TECHNOLOGICAL FIELD

Exemplary embodiments of this disclosure relate generally to methods, apparatuses, or computer program products for estimating or adjusting contact force in actuators, such as pneumatic actuators.

BACKGROUND

Soft inflatable actuators are increasingly being used with haptic technologies (e.g., haptic gloves or a blind support haptic wearable band) and beyond. Inflatable actuators are soft, robust, lightweight, and compact, making them a good candidate for wearables. Measuring the force applied to an actuator is important for haptics applications so that the system can ensure it is applying the right feedback (e.g., making sure a wristband is in contact with the user, knowing how hard a user is squeezing a device), but the soft, deformable nature of pneumatic actuators makes it challenging to add additional sensors (that are often rigid or bulky) at the interface between the user and the inflatable actuator. Air pressure sensors are cheap, easily miniaturizable, and already integrated into many soft actuation systems.

The aforementioned haptic technologies may be a part of an artificial reality system. Artificial reality is a form of reality that has been adjusted in some manner before presentation to a user, which may include, for example, a virtual reality, an augmented reality, a mixed reality, a hybrid reality, or some combination or derivative thereof. Artificial reality content may include completely computer-generated content or computer-generated content combined with captured (e.g., real-world) content. The artificial reality content may include video, audio, haptic feedback, or some combination thereof, any of which may be presented in a single channel or in multiple channels (such as stereo video that produces a three-dimensional (3D) effect to the viewer). Additionally, in some instances, artificial reality may also be associated with applications, products, accessories, services, or some combination thereof, that are used to, for example, create content in an artificial reality or are otherwise used in (e.g., to perform activities in) an artificial reality. Head-mounted displays (HMDs) including one or more near-eye displays may often be used to present visual content to a user for use in artificial reality applications, while haptic technologies provide feedback to a user.

SUMMARY

Disclosed herein are methods, apparatuses, or systems for estimating or adjusting the contact force of a pneumatic actuator from measured air pressure and a system model. In an example, wearable pneumatic haptic systems may incorporate pressure-based interaction state estimation in order to enable haptic interactions while reducing the need for some types of external sensing.

In another example, an apparatus may include one or more processors and memory. The memory may be coupled with the one or more processors and store executable instructions that when executed by the one or more processors cause the one or more processors to effectuate operations comprising receiving a pressure measurement of a fluid in an actuator; determining, based on the pressure measurement, a mass of the fluid in the actuator; based on the mass of the fluid and the pressure measurement of the fluid, determining a height of the actuator; calculating a contact force based on the height of the actuator and the pressure measurement of the fluid; and transmitting the contact force.

Additional advantages will be set forth in part in the description which follows or may be learned by practice. The advantages will be realized and attained by means of the elements and combinations particularly pointed out in the appended claims. It is to be understood that both the foregoing general description and the following detailed description are exemplary and explanatory only and are not restrictive, as claimed.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

Some embodiments will now be described more fully hereinafter with reference to the accompanying drawings, in which some, but not all embodiments are shown. Indeed, various embodiments may be in many different forms and should not be construed as limited to the embodiments set forth herein. Like reference numerals refer to like elements throughout.

It is to be understood that the methods and systems described herein are not limited to specific methods, specific components, or to particular implementations. It is also to be understood that the terminology used herein is for the purpose of describing particular embodiments only and is not intended to be limiting.

As wearable technologies become more ubiquitous, new devices, which may sense and mediate user interaction (e.g., with artificial reality systems, among others), may be developed. Outputting physical feedback to the user through a wearable device is particularly challenging because typical actuators (e.g., motors and servos) tend to be rigid, heavy, or cumbersome. In contrast, soft pneumatic actuators such as bellows may be flexible, stretchable, and compliant, making them both safer to interact with and easier to incorporate into wearable devices that conform to different body geometries.

Figure 1A:
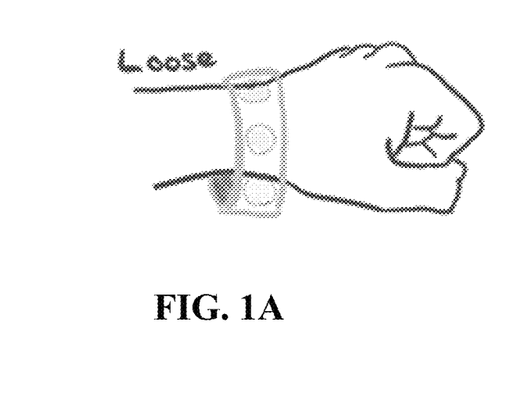
FIG. 1A illustrates an example in which a first air pressure produces a first contact force on a user.
Figure 1B:
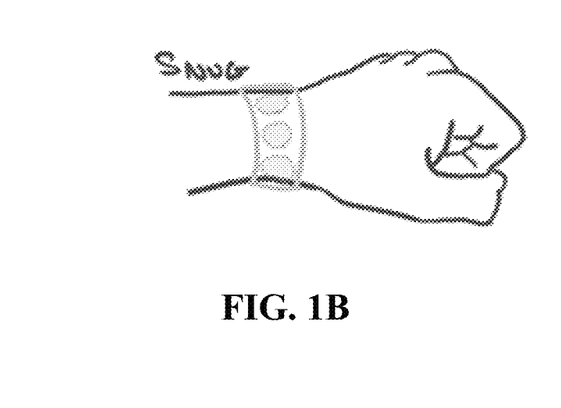
FIG. 1B illustrates an example in which the same first air pressure of FIG. 1A produces a different contact force when a user uses the same the wearable device.

Although air pressure sensors may be cheap and already integrated into many soft pneumatic actuation systems, consideration of air pressure information alone in conventional systems is usually not enough information to determine how much force is applied. This may be because both pressurization and deformation (e.g., deformation from user interaction) may affect the internal air pressure of the actuator. FIG. 1A-FIG. 1B illustrate an example in which the same air pressure produces different contact forces on the user depending on the fit of the wearable device. In this example, at the same pounds per square inch (e.g., 5 PSI), a wristband with actuators may be loose on a user as shown in FIG. 1A or tight on the user as shown in FIG. 1B. Disclosed herein are methods, systems, or apparatuses for determining (and then controlling) how much force a device imparts (e.g., an actuator on a user) by using pressure sensing, which may reduce or remove the need for additional sensing. Estimating these forces may be enabled by modeling the fluid mass and deformation of a pneumatic system.

Figure 2:
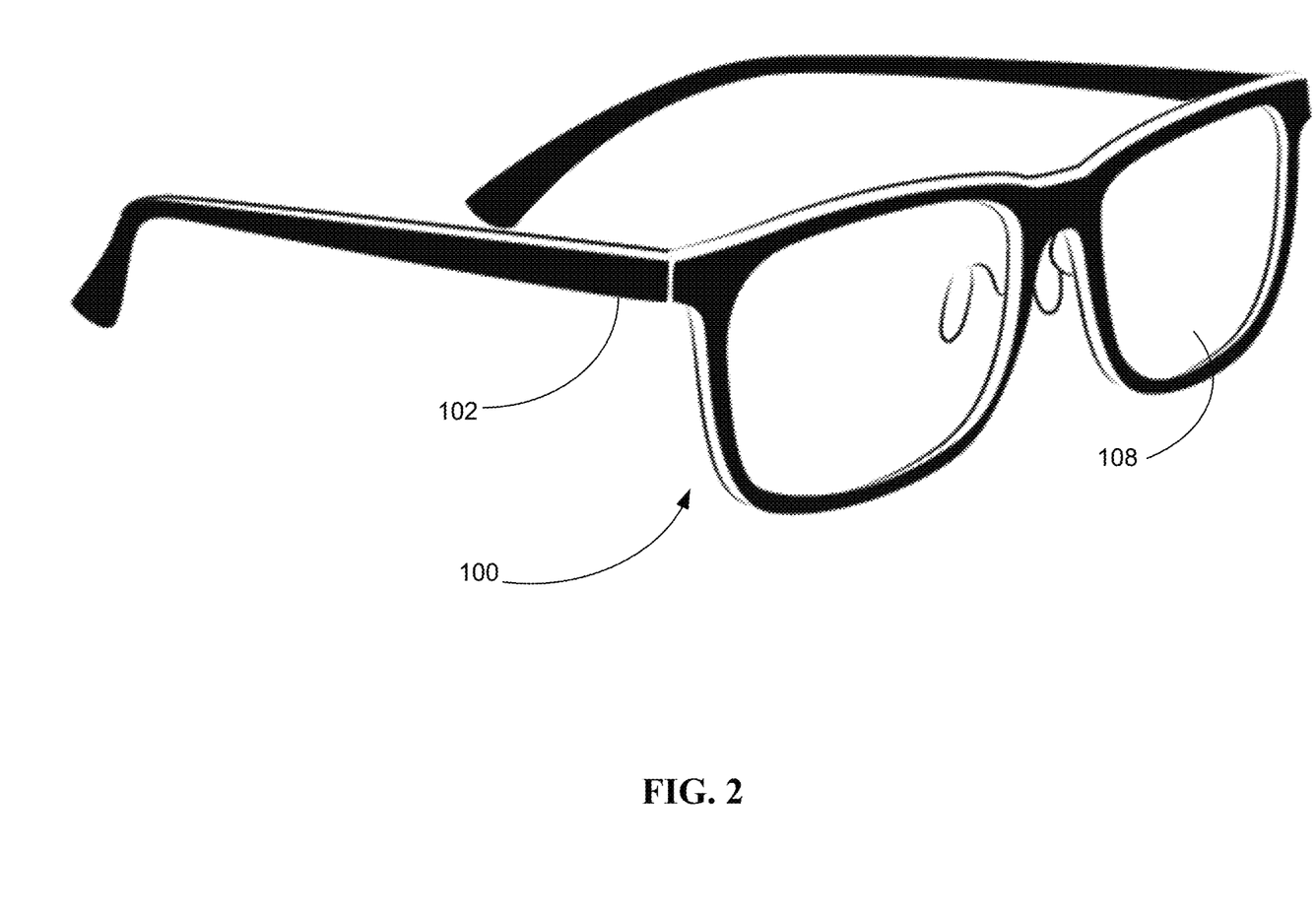
FIG. 2 illustrates an example actuation system that may include the use of a HMD associated with artificial reality content.

FIG. 2 illustrates an example actuation system that includes the use of a head-mounted display (HMD) 100 associated with artificial reality content. HMD 100 may include enclosure 102 (e.g., an eyeglass frame) or waveguide 108. Waveguide 108 may be configured to direct images to a user's eye. In some examples, head-mounted display 100 may be implemented in the form of augmented-reality glasses. Accordingly, the waveguide 108 may be at least partially transparent to visible light to allow the user to view a real-world environment through the waveguide 108. Haptic assembly 111 (e.g., wristband or glove) may be connected with HMD 100. As disclosed in more detail herein, HMD 100 and haptic assembly 111 may exchange signals with each other. Although artificial reality and pneumatic systems are used in examples herein, it is contemplated that the disclosed methods, systems, or apparatuses may be applicable in other scenarios.

Figure 3:
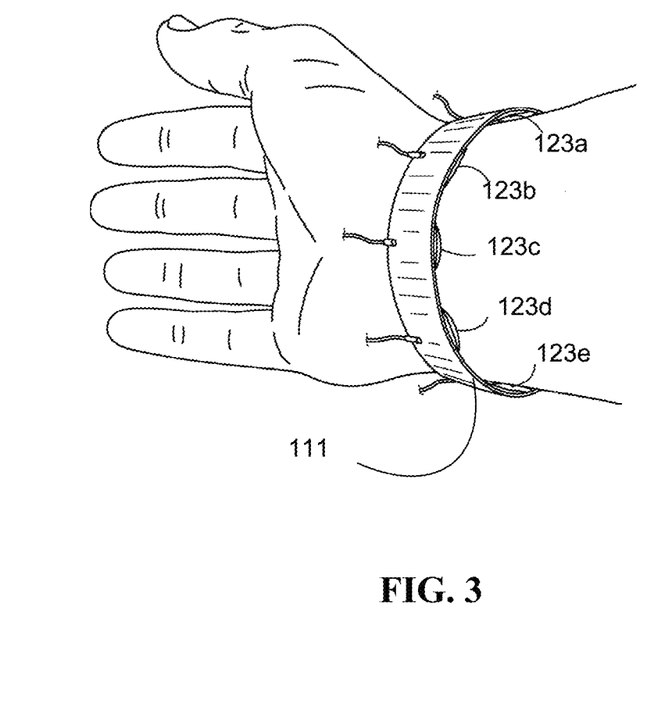
FIG. 3 illustrates an exemplary zoomed in perspective of a haptic assembly.

FIG. 3 illustrates zoomed in perspective of haptic assembly 111. Haptic assembly 111 may create haptic stimulations and may include actuator 123a, actuator 123b, actuator 123c, actuator 123d, or actuator 123e, among other actuators which may be referred herein as actuator 123. Actuator 123 may be located on a band fitted for a wrist or arm, located on fingertips of a glove (not shown), located on glasses, located on other clothing, or located on other devices, which may be wearable. As disclosed, haptic assembly 111 may be a wearable structure that may be a flexible mechanical substrate such as a plastic (e.g., polyethylene or polypropylene), rubber, nylon, synthetic, polymer, etc. In some examples, the wearable structure is configured to be worn on any body part of a user, such as arm, leg, upper torso, head, or the like.

Figure 4:
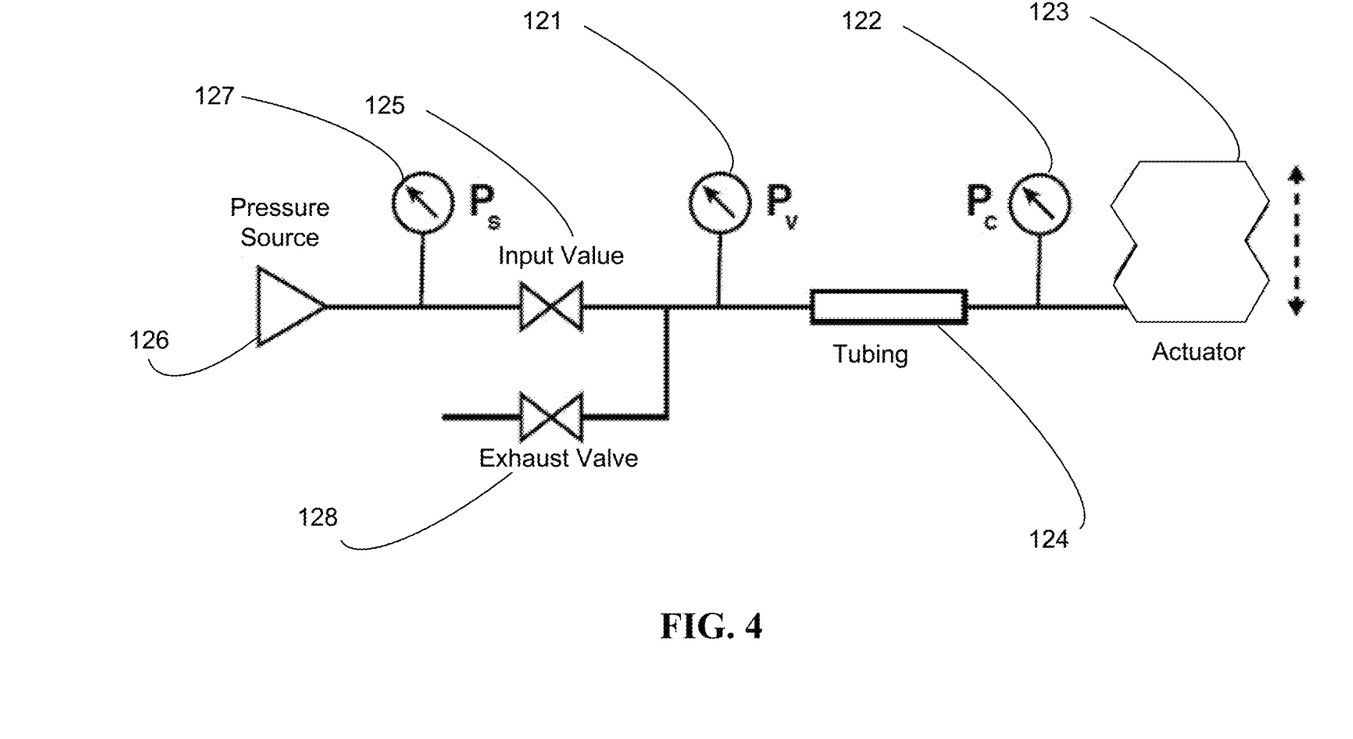
FIG. 4 illustrates an exemplary actuator system that may be implemented with a haptic assembly.

FIG. 4 illustrates an exemplary actuator system that may be implemented with haptic assembly 111. This general setup may capture a wide array of pneumatic actuation systems.

Haptic assembly 111 may include actuator 123 (e.g., a soft actuator), pressure source 126, input valve 125, exhaust valve 128, pressure sensor 127 (e.g., $P_s$ sensor), pressure sensor 121 (e.g., $P_v$ sensor), pressure sensor 122 (e.g., $P_c$ sensor), or actuator 123, which may each be fluidically coupled with each other via tubing 124 or the like. Tubing 124 may be ethylene propylene diene monomer (EPDM) rubber tubing (or various other types of tubing 124 may also be used). A soft actuator 123 may be fluidically coupled with pressure source 126 via pneumatic tubing 124 and a controllable valve (e.g., solenoid or piezoelectric valve), such as input valve 125. Exhaust valve 128, which is controllable and fluidically coupled with actuator 123, may allow depressurization of actuator 123.

Actuator 123 may be fluidically coupled (e.g., pneumatically, electrically, hydraulically, etc.) with a pressure-changing device (e.g., pressure source 126) that is configured to control a fluid pressure (e.g., pressurized state) of actuator 123. Actuator 123 may be configured to deform (e.g., elastically deform, expand, or lengthen) in one or more directions (e.g., in-plane, out-of-plane, longitudinally, laterally, or radially) according to a design of a predefined pattern in relation with (e.g., based on or proportional with) a fluid pressure inside actuator 123. When actuator 123 receives fluid (e.g., a fluid medium such as a gas or liquid) from pressure source 126, actuator 123 expands, which may cause actuator 123 to expand in the one or more directions and also to reinforce actuator 123 in the one or more directions.

By changing the fluid pressure in actuator 123 (e.g., actuator 123a, actuator 123b, or actuator 123c), actuator 123 may expand in the one or more directions and haptic assembly 111 may exert a force (e.g., against a user's limb or fingers), generating different haptic stimulations.

In soft pneumatic actuators, air pressure is typically controlled to alter the output shape or force. Pneumatic pressure sensors can be made both small and inexpensive, and may be placed anywhere along the pneumatic routing, freeing the interface from additional hardware. Applying a force to a soft actuator (e.g., in a closed system) should change its internal pressure, due to the resulting change in volume and the Ideal Gas Law (PV=mRT). Therefore, the air pressure in an actuator may be useful for measuring applied force.

Consider the case in which both the pressure $P_c$ (at sensor 122 for actuator 123) and mass m of air in actuator 123 are known. From the ideal gas law, these may be related to the volume of actuator 123 according to:

$$V = \frac{mRT}{P_c} \quad (1)$$

From a physical perspective, the contact force $F_a$ of a pneumatic actuator is influenced by the actuator's internal pressure and its volume (e.g., how much the actuator is compressed), which may be generally expressed as follows:

$$F_a = f(V, P_c) \quad (2)$$

The nature of this relationship may be influenced by multiple factors that include material stiffness or contact geometry. Approximations of this relationship may be referred to as the Deformation Model of a given actuator. A deformation model may be considered a quasi-static or dynamic model of actuator deformation. Together, Eq. (1) and Eq. (2) demonstrate how air pressure and mass may be related to the contact force of actuator 123. To estimate air mass from pressure measurements, a Mass Flow Model may be used as shown in Eq. (3):

$$\dot{m} = f(P_c) \quad (3)$$

By integrating estimates of mass flow over time, an estimate of air mass in the system may be determined. In summary, given appropriate models of mass flow and deformation, pressure measurement may be related to contact force. Herein are example models for mass flow and deformation as they relate to haptic assembly 111. It is contemplated that different models may be used within the same overall approach.

An exemplary mass estimation approach (e.g., a mass flow model) is disclosed below. As shown in Eq. (4), a linear resistance model may be used to estimate mass flow through a pneumatic element (e.g., tube, orifice) from a measured pressure differential ΔP.

$$\dot{m} = R_t^{-1} \Delta P \tag{4}$$

Here $R_t$ is the known fluidic resistance of the resistive element, which is approximated as constant. While more complex fluidic resistance models exist, it was found through experimentation that the Eq. (4) model was sufficiently accurate for the disclosed system (e.g., haptic assembly 111).

Figure 5A:
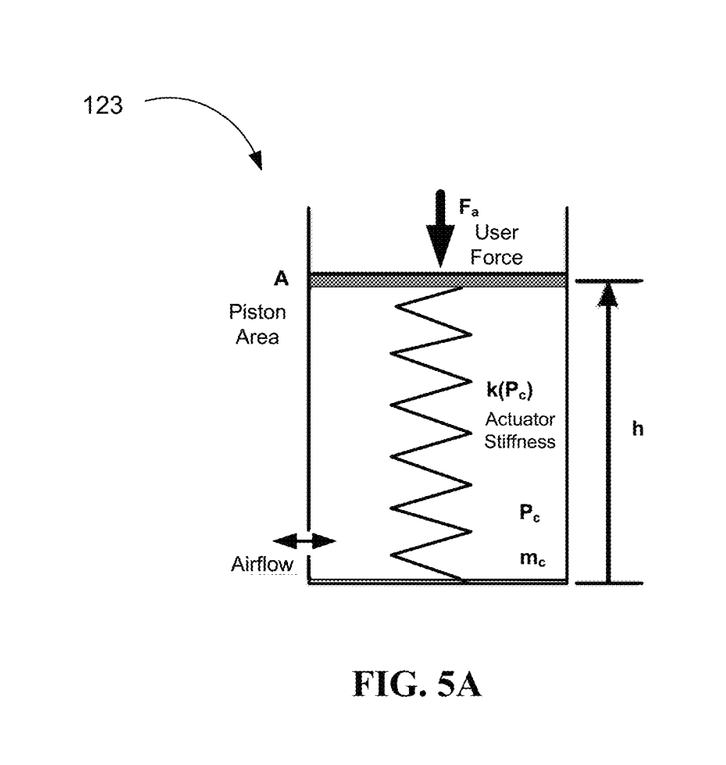
FIG. 5A illustrates an exemplary piston-spring model of a soft pneumatic actuator.
Figure 5B:
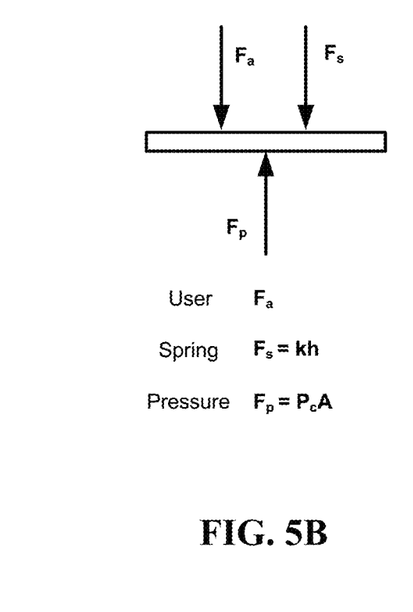
FIG. 5B illustrates exemplary forces associated with FIG. 5A.

An exemplary force estimation approach (e.g., a deformation model) is disclosed below. Herein, a pneumatic bellow actuator is considered as an example. It was found through experimentation that this bellow actuator may be modeled as a variable stiffness piston-spring system, as illustrated in FIG. 5A. FIG. 5A illustrates an exemplary piston-spring model of a soft pneumatic actuator 123. The spring stiffness k may vary with pressure and may capture material stress-strain properties. FIG. 5B illustrates an exemplary quasi-static force balance of a piston which shows that external force may be balanced by internal air pressure and variable spring forces. FIG. 5A-FIG. 5B may help illustrate some of the mechanics of the disclosed subject matter.

A quasi-static force balance gives the following relationship, where $F_a$ is the contact force, $F_p$ is the upward force from internal air pressure, and $F_s$ is the restorative spring force of the actuator, as shown in FIG. 5B and Eq. (5):

$$F_a = F_p - F_s \tag{5}$$

Contact force ($F_a$) may be defined as the force exerted by the actuator on the environment. This is equivalent in magnitude to the force exerted by the environment on the actuator.

Substituting the expressions for the pressurization and spring forces provides Eq. (6), where A is the approximate piston area, h is the height of the actuator, and $k(P_c)$ is the actuator stiffness, which varies with pressure:

$$F_a = P_c A - k(P_c) h \tag{6}$$

From the piston-spring model of FIG. 5A, this volume may be estimated as V=Ah. Combining this with Eq. (6) and Eq. (1) yields the following expression in Eq. (7) for contact force as a function of actuator air pressure and mass:

$$F_a = P_c A - k(P_c) \frac{RT}{A} \frac{m}{P_c} \tag{7}$$

As disclosed, the pressure gradient may be used to estimate mass m, as in Eq. (4). Here, the actuator pressure $P_c$ from sensor 122 may be used directly (along with the mass) to estimate contact force $F_a$. With regard to using both pressure sensors (e.g., sensor 121 and sensor 122) versus just one (e.g., sensor 121), this relates to estimating the mass flow through the system (e.g., to/from the actuator through tubing 124). In a first implementation, the pressure difference between sensor 122 and sensor 121 and the resistance of tubing 124 may be used to estimate mass flow.

With regard to an alternative implementation, it may involve measuring only pressure sensor 121 (assuming the source pressure 127 is known and constant). This method may be similar in principle to the first implementation, except now the resistance of input valve 125 may be used rather than the resistance of tubing 124. The valve resistance may be comparatively much smaller (and also no longer constant, so a model for valve resistance may be needed). Because the resistance may be much smaller, the pressure difference (sensor 127 to sensor 121) across the resistive element may be much smaller for a given mass flow rate (which may be seen from Eq. 4) compared to the difference between sensor 121 and sensor 122. Therefore, for this alternative implementation, the pressure measurement at sensor 121 should be highly accurate, since small measurement errors may lead to big estimation errors for mass flow. Again, the first implementation may be preferred for less accurate sensors in which the pressure difference between sensor 122 and sensor 121 and the resistance of tubing 124 may be used to estimate mass flow.

Figure 6:
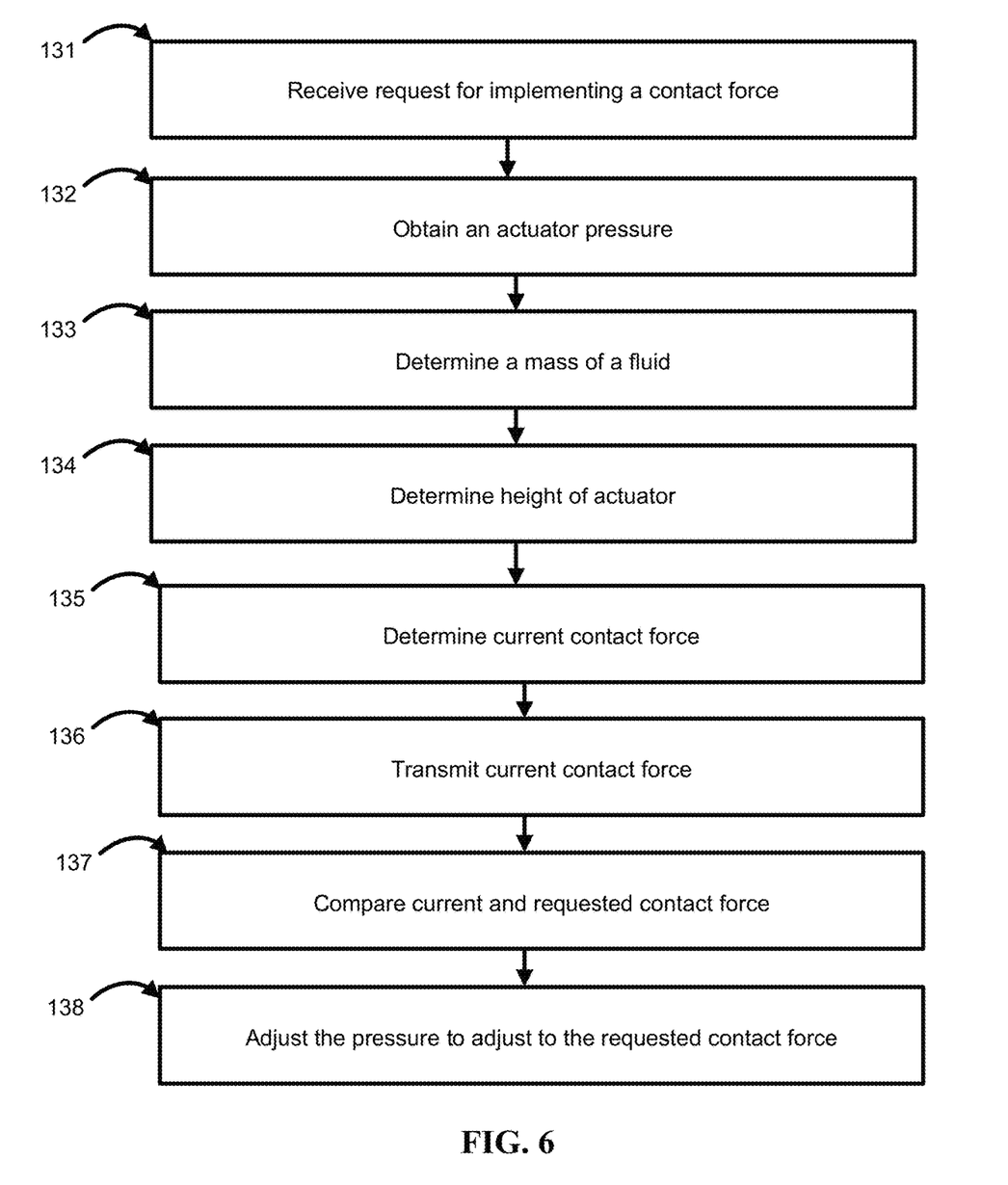
FIG. 6 illustrates an exemplary method for estimating or controlling contact force.

FIG. 6 illustrates an exemplary method for estimating or controlling contact force in actuators.

At step 131, a request for implementing a contact force (e.g., requested contact force) associated with actuator 123 may be received.

At step 132, obtaining an actuator pressure of fluid in actuator 123. Actuator 123 may be a component of haptic assembly 111. The actuator pressure may be based on measurements from one or more pressure sensors in haptic assembly 111, such as sensor 122, sensor 121, or sensor 127.

At step 133, a mass of the fluid in actuator 123 may be determined. The mass of the fluid may be calculated using a model that may be tailored for one or more components of haptic assembly 111, such as a mass flow rate (e.g., Eq (4)) through tubing 124, valve 125, or valve 128.

At step 134, a height of actuator 123 may be determined, which may be based on the mass of the fluid or the actuator pressure. Eq. (8) or the like may be used to determine the height of actuator 123.

$$h = \frac{RT}{A} \frac{m}{P_c} \tag{8}$$

At step 135, a current contact force of actuator 123 may be calculated, which may be based on the height of actuator 123 and the actuator pressure. The calculation of the current contact force may be based on a deformation model, as disclosed herein. The calculation of the contact force may further be based on a piston area of actuator 123 or actuator stiffness that is based on a change of pressure. The material of the inflatable actuator may be considered the spring—as the actuator inflates, the rubbery material (in our case, thermoplastic polyurethane) stretches and acts as a spring. The "stiffness" may be a function of pressure and may encompass things like the properties and geometry of the material. The piston area some scenarios may be possible to use an "equivalent area" determined through some experimental testing. For very different actuators which may not be well-modeled by a piston-spring example herein, a different deformation model may be used, as Eq. 7 shows in the general form.

At step 136, the current contact force may be transmitted to one or more devices. In an example, the current contact force may be transmitted to a local computing processor of haptic assembly 111, a remote computing processor of HMD 100, or to some other computing device, which may display the current contact force or use it for further analysis.

At step 137, there may be a comparison of the current contact force (e.g., step 135) and the requested contact force (e.g., at step 131). As can be imagined, if the current contact force and the requested contact force are the same, then no adjustments are needed to haptic assembly 111. At step 138, when the current contact force and the requested contact force are different, then the actuator pressure may be adjusted (e.g., using pressure source 126 or exhaust valve 128). The actuator pressure may be increased or decreased in order to change the current contact force to the requested contact force. If the current contact force and the requested contact force are the same, then no adjustment may be made.

Figure 7:
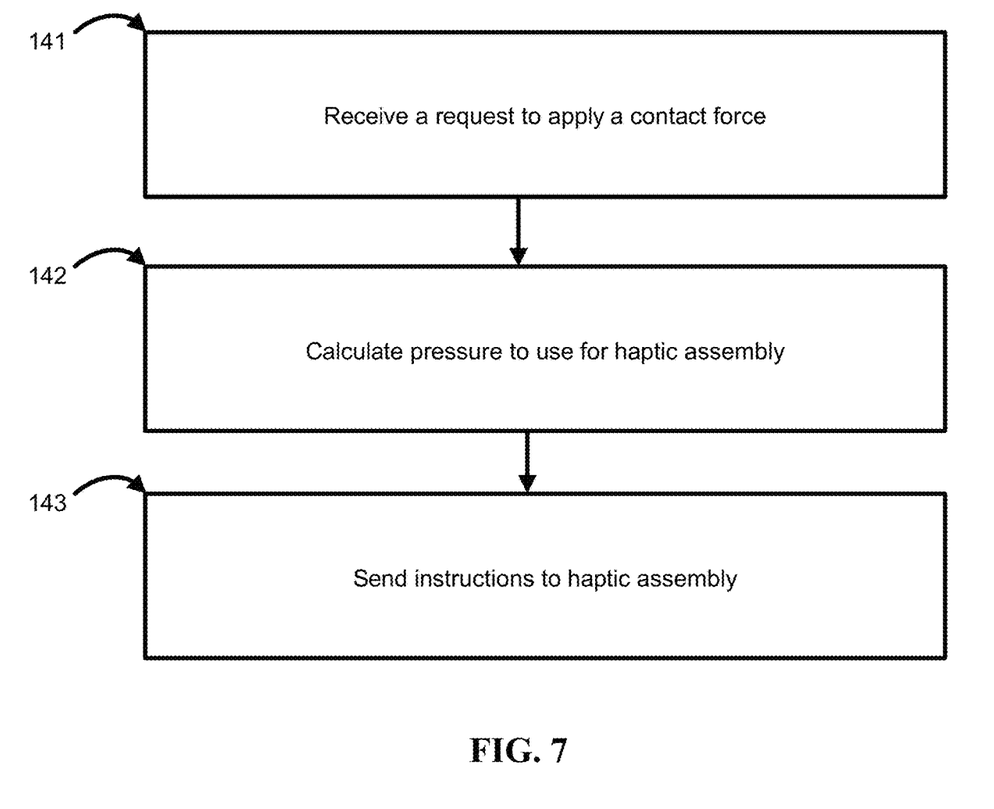
FIG. 7 illustrates an exemplary method for estimating or controlling contact force.

FIG. 7 illustrates an exemplary method for estimating or controlling contact force in actuators. At step 141, a request to apply a contact force may be obtained (e.g., received), which may be applied by actuator 123. This requested contact force may be in response to a use of an artificial reality system (e.g., HMD 100). For example, a user's avatar in the virtual environment may be pulled by the wrist by a second avatar, which may trigger a request for an increased contact force.

At step 142, based on the requested contact force, calculating a pressure to use for one or more components of haptic assembly 111. The determining of the pressure may be based on using a mass flow rate model tailored for the one or more components of haptic assembly 111 or other approaches as disclosed herein.

At step 143, sending a message that may include instructions to change actuator pressure to the pressure of step 142 that will correspond to the requested contact force of step 141.

It is contemplated herein that the steps (e.g., FIG. 6 or FIG. 7) may occur on one device (e.g., haptic assembly 111 or HMD 100) or over multiple devices (e.g., haptic assembly 111 and HMD 100). After determining mass, height, or contact force, any one of them may be transmitted to one more computing processing units for further processing, in which one or more of the equations herein may be used to calculate other variables. The methods herein may be iterative and continually (or periodically) estimate or adjust contact force.

In some examples, pressure source 126 may be a pneumatic device, hydraulic device, a pneudraulic device, or some other device capable of adding and removing a medium from one or more components of haptic assembly 111. In other words, the discussion herein is not limited to pneumatic devices, but for ease of discussion, pneumatic devices are used as the primary example herein.

The disclosed estimating or adjusting contact force in actuators approach may be related to wearable pneumatic haptic systems. In a first example, the approach may address the challenge of grounding (e.g., ensuring proper fit between the user and a wearable haptic device). Using the disclosed systems and methods, estimate of the force on the actuator passively applied by the user's wrist may be obtained without requiring any additional types of sensor instrumentation. If the estimated contact force is below the desired grounding force to ensure a proper fit, the source pressure may be regulated to compensate in a closed-loop manner.

In another example, with regard to a similar wearable form factor, the use of the bellow to render haptic feedback was explored. In this scenario, the user may actively apply force to actuator 123 with their other hand. When a certain force threshold is reached, the pressure may be adjusted in the bellow to render haptic feedback, such as a button click.

In general, the disclosed estimation approach may rely on generated models of one or more components of haptic assembly 111, and therefore its performance may be tied to the accuracy of these models. These models may be generated by using testing information associated the one or more components of haptic assembly 111. The exemplary implementations may leverage models for mass flow and deformation that each rely on several considerations. Firstly, the linearity of the mass flow model (e.g., Eq. (4)) may not be affected by the magnitude of downstream (e.g., actuator) pressure. However, under certain conditions, pneumatic mass flow through fixed tubes and orifices may exhibit nonlinearity depending on the downstream pressure. While we don't believe this to have had a major impact on the present implementation given the high pneumatic resistance and relatively low operating pressures, it is contemplated that more complex nonlinear models may be incorporated for pneumatic flow to further increase accuracy.

Additionally, while a presented implementation may use multiple pressure sensors in the routing after the valves to obtain a flow estimate (e.g., FIG. 4), valve pressure alone may be used to estimate flow into and out of the system given a sufficiently accurate model of valve resistance.

Although exemplary deformation model disclosed herein explains the actuator behavior well with the piston-spring model, it assumes a uniformly applied axial force and may not account for surface deformations of the actuator. During experimentation it was found that it is a reasonable assumption for some wearable applications. More complex deformation models may capture the effects of contact geometry on the system and be incorporated into the estimation process.

The approach for estimating adjusting the contact force of a pneumatic actuator from measured air pressure and a system model is disclosed herein. Future wearable pneumatic haptic systems may benefit by incorporating pressure-based interaction state estimation as it may enable richer haptic interactions while reducing the need for cumbersome external sensing.

Figure 8:
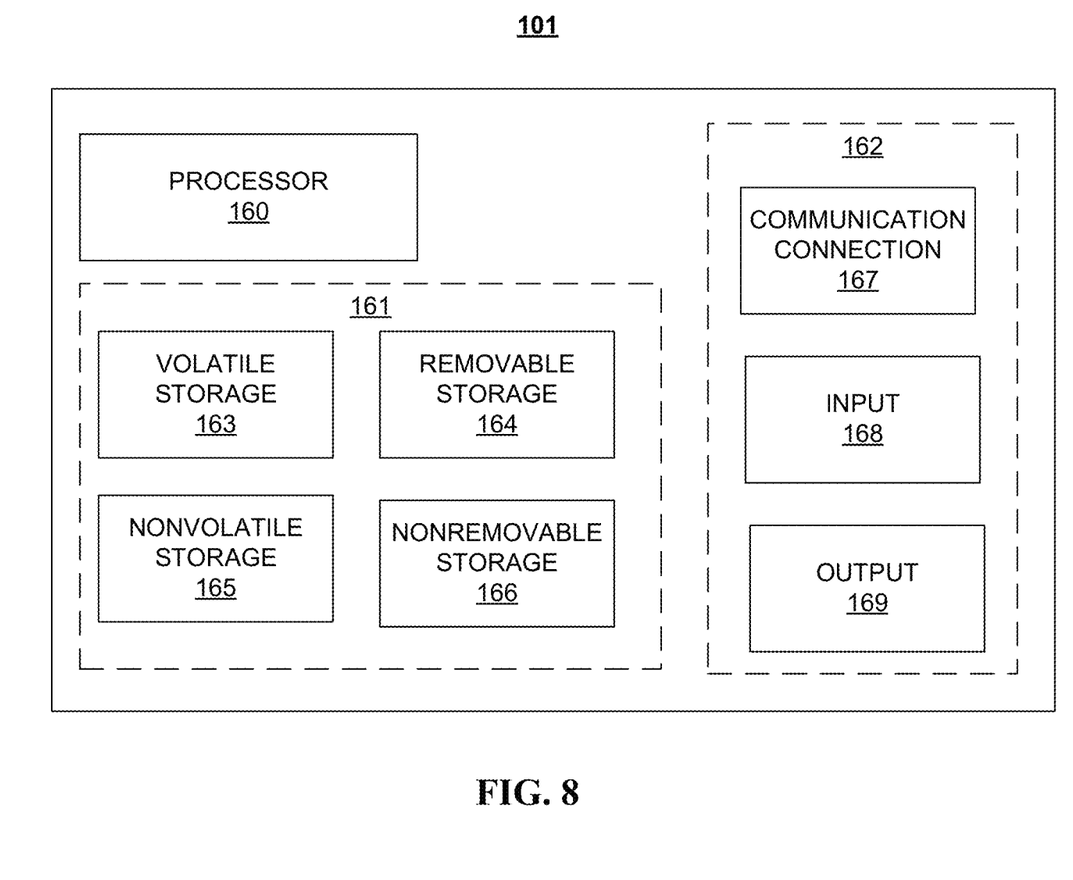
FIG. 8 illustrates an exemplary block diagram of a device.

FIG. 8 is an exemplary block diagram of a device, such as HMD 100, haptic assembly 111, or another device 101. In an example, HMD 100 may include hardware or a combination of hardware and software. The functionality to facilitate telecommunications via a telecommunications network may reside in one or combination of devices. A device may represent or perform functionality of one or more devices, such as a component or various components of a cellular broadcast system wireless network, a processor, a server, a gateway, a node, a gaming device, or the like, or any appropriate combination thereof. It is emphasized that the block diagram depicted in FIG. 8 is exemplary and not intended to imply a limitation to a specific implementation or configuration. Thus, HMD 100 or haptic assembly 111, for example, may be implemented in a single device or multiple devices (e.g., single server or multiple servers, single gateway or multiple gateways, single controller or multiple controllers). Multiple network entities may be distributed or centrally located. Multiple network entities may communicate wirelessly, via hardwire, or any appropriate combination thereof.

HMD 100, haptic assembly 111, or another device may comprise a processor 160 or a memory 161, in which the memory may be coupled with processor 160. Memory 161 may contain executable instructions that, when executed by processor 160, cause processor 160 to effectuate operations associated with estimation or control of contact force, or other subject matter disclosed herein.

In addition to processor 160 and memory 161, HMD 100, haptic assembly 111, or another device may include an input/output system 162. Processor 160, memory 161, or input/output system 162 may be coupled together (coupling not shown in FIG. 8) to allow communications between them. Each portion of HMD 100, haptic assembly 111, or another device may include circuitry for performing functions associated with each respective portion. Thus, each portion may include hardware, or a combination of hardware and software. Input/output system 162 may be capable of receiving or providing information from or to a communications device or other network entities configured for telecommunications. For example, input/output system 162 may include a wireless communications (e.g., Wi-Fi, Bluetooth, or 5G) card. Input/output system 162 may be capable of receiving or sending video information, audio information, control information, image information, data, or any combination thereof. Input/output system 162 may be capable of transferring information with HMD 100, haptic assembly 111, or another device. In various configurations, input/output system 162 may receive or provide information via any appropriate means, such as, for example, optical means (e.g., infrared), electromagnetic means (e.g., radio frequency (RF), Wi-Fi, Bluetooth), acoustic means (e.g., speaker, microphone, ultrasonic receiver, ultrasonic transmitter), or a combination thereof. In an example configuration, input/output system 162 may comprise a Wi-Fi finder, a two-way global positioning system (GPS) chipset or equivalent, or the like, or a combination thereof.

Input/output system 162 of HMD 100, haptic assembly 111, or another device also may include a communication connection 167 that allows HMD 100, haptic assembly 111, or another device to communicate with other devices, network entities, or the like. Communication connection 167 may comprise communication media. Communication media typically embody computer-readable instructions, data structures, program modules or other data in a modulated data signal such as a carrier wave or other transport mechanism and includes any information delivery media. By way of example, and not limitation, communication media may include wired media such as a wired network or direct-wired connection, or wireless media such as acoustic, RF, infrared, or other wireless media. The term computer-readable media as used herein includes both storage media and communication media. Input/output system 162 also may include an input device 168 such as keyboard, mouse, pen, voice input device, or touch input device. Input/output system 162 may also include an output device 169, such as a display, speakers, or a printer.

Processor 160 may be capable of performing functions associated with telecommunications, such as functions for processing broadcast messages, as described herein. For example, processor 160 may be capable of, in conjunction with any other portion of HMD 100, haptic assembly 111, or another device, determining a type of broadcast message and acting according to the broadcast message type or content, as described herein.

Memory 161 of HMD 100, haptic assembly 111, or another device may comprise a storage medium having a concrete, tangible, physical structure. As is known, a signal does not have a concrete, tangible, physical structure. Memory 161, as well as any computer-readable storage medium described herein, is not to be construed as a signal. Memory 161, as well as any computer-readable storage medium described herein, is not to be construed as a transient signal. Memory 161, as well as any computer-readable storage medium described herein, is not to be construed as a propagating signal. Memory 161, as well as any computer-readable storage medium described herein, is to be construed as an article of manufacture.

Herein, a computer-readable storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable storage medium may be volatile, non-volatile, or a combination of volatile and non-volatile, where appropriate.

While the disclosed systems have been described in connection with the various examples of the various figures, it is to be understood that other similar implementations may be used or modifications and additions may be made to the described examples of a estimation or control of contact force, among other things as disclosed herein. For example, one skilled in the art will recognize that estimation or control of contact force, among other things as disclosed herein in the instant application may apply to any environment, whether wired or wireless, and may be applied to any number of such devices connected via a communications network and interacting across the network. Therefore, the disclosed systems as described herein should not be limited to any single example, but rather should be construed in breadth and scope in accordance with the appended claims.

In describing preferred methods, systems, or apparatuses of the subject matter of the present disclosure—estimation or control of contact force—as illustrated in the Figures, specific terminology is employed for the sake of clarity. The claimed subject matter, however, is not intended to be limited to the specific terminology so selected.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

Also, as used in the specification including the appended claims, the singular forms "a," "an," and "the" include the plural, and reference to a particular numerical value includes at least that particular value, unless the context clearly dictates otherwise. The term "plurality", as used herein, means more than one. When a range of values is expressed, another embodiment includes from the one particular value or to the other particular value. Similarly, when values are expressed as approximations, by use of the antecedent "about," it will be understood that the particular value forms another embodiment. All ranges are inclusive and combinable. It is to be understood that the terminology used herein is for the purpose of describing particular aspects only and is not intended to be limiting.

This written description uses examples to enable any person skilled in the art to practice the claimed subject matter, including making and using any devices or systems and performing any incorporated methods. Other variations of the examples are contemplated herein. It is to be appreciated that certain features of the disclosed subject matter which are, for clarity, described herein in the context of separate embodiments, may also be provided in combination in a single embodiment. Conversely, various features of the disclosed subject matter that are, for brevity, described in the context of a single embodiment, may also be provided separately or in any sub-combination. Further, any reference to values stated in ranges includes each and every value within that range. Any documents cited herein are incorporated herein by reference in their entireties for any and all purposes.

The scope of this disclosure encompasses all changes, substitutions, variations, alterations, and modifications to the example embodiments described or illustrated herein that a person having ordinary skill in the art would comprehend. The scope of this disclosure is not limited to the examples described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

Methods, systems, and apparatuses, among other things, as described herein may provide for estimation or control of contact force. A method, system, computer readable storage medium, or apparatus may provide for determining the current mass flow to the actuator m' from the measured pressure differential Pc–Ps (e.g., Eq. 4); numerically integrating m' to determine current mass; determining actuator height from actuator mass and pressure (linear smoothing regression model to experimental data—lowess regression model); determining contact force from estimated height or measured pressure (e.g., Eq. 6); and transmitting the determined contact force. A method, system, computer readable storage medium, or apparatus may provide for receiving a pressure measurement of a fluid in an actuator; determining, based on the pressure measurement, a mass of the fluid in the actuator, wherein the determining of the mass comprises using a (mass flow rate) model tailored for a system; based on the mass of the fluid or the pressure measurement of the fluid, determining a height of the actuator; calculating a contact force based on the height of the actuator or the pressure measurement of the fluid, wherein the calculating (e.g., determining) the contact force of the actuator comprises using a deformation model; and transmitting the contact force. The contact force may be transmitted to a display, an artificial reality system, a gaming system, or another device. The fluid may include air. The method, system, computer readable storage medium, or apparatus may provide for receiving a requested contact force; and sending a message, the message comprising instructions to increase or decrease the pressure of the actuator in order to change the contact force to the requested contact force. The calculation of the contact force may be further based on the height of the actuator, a piston area of the actuator, or actuator stiffness that may be based on a change of pressure. The pressure measurement may be based on a comparison of a first pressure from a first pressure sensor and a second pressure of a second pressure sensor. The deformation model may be $F_a = P_c A - k(P_c)h$, wherein $F_a$ is the contact force, $P_c$ is the pressure, A is an approximate piston area, $k(P_c)$ is stiffness of the actuator, and h is the height of the actuator. The mass flow rate model may be $\dot{m} = R_r^{-1} \Delta P$, wherein Rr is the known fluidic resistance of a resistive element of the system, $\Delta P$ is a measured pressure differential. All combinations in this paragraph and the following paragraph (including the removal or addition of steps) are contemplated in a manner that is consistent with the other portions of the detailed description.

Methods, systems, and apparatuses, among other things, as described herein may provide for estimation or control of contact force. A method, system, computer readable storage medium, or apparatus may provide for obtaining a first pressure at a first position during a first period, the first position associated with a pneumatic system; obtaining a second pressure at a second position during a second period, the second position is associated with the pneumatic system; determining a change in pressure based on the first pressure and the second pressure; based on the change in pressure, determining a first mass (e.g., mass flow through a pneumatic element); determining a contact force of an actuator of the pneumatic system based on the first pressure or first mass; and transmitting the contact force. A system may provide for a pressure source; a first pressure sensor; a second pressure sensor; tubing between the first pressure sensor and the second pressure sensor; and an actuator. The pressure source may be a pneumatic device. A method, system, computer readable storage medium, or apparatus may provide for determining a contact force to apply using the actuator; based on the contact force, determining a pressure to use for the haptic assembly, wherein the determining of the pressure is based on using a mass flow rate model tailored for the haptic assembly; and sending a message to the haptic assembly, wherein the message comprises instructions to change actuator pressure to the pressure to use to create the contact force for the haptic assembly. The actuator may be part of a haptic assembly, wherein the haptic assembly is part of wearable device. The pressure source is a pneumatic device or a hydraulic device, some combination thereof, or any other device capable of adjusting pressure (e.g., fluid pressure). Although haptic assembly is disclosed, this approach broadly applies to pneumatic actuation and sensing systems, which may include wearable haptic display applications and soft robotics applications. The actuator may receive fluid via the pressure-changing device. All combinations in this paragraph and the previous paragraph (including the removal or addition of steps) are contemplated in a manner that is consistent with the other portions of the detailed description.

What is claimed:
1. A system comprising:
an actuator fluidically coupled with a pressure-changing device, the pressure-changing device being configured to control a pressure of fluid in the actuator; and
a computer readable storage medium storing computer executable instructions that when executed by a device cause the device to:
receive a pressure measurement of a fluid in the actuator;
determine, based on the pressure measurement, a mass of the fluid in the actuator, wherein the determine of the mass comprises using a model associated with one or more components of a haptic assembly;
determine, based on the mass of the fluid, a height of the actuator;

determine a contact force based on the height of the actuator and the pressure measurement of the fluid;
transmit the contact force;
determine, based on the contact force, a modified pressure to create a second contact force associated with the one or more components of the haptic assembly; and
adjust the pressure of the actuator to the modified pressure.

2. The system of claim 1, wherein the contact force is transmitted to an artificial reality device.

3. The system of claim 1, wherein the contact force is transmitted to a display.

4. The system of claim 1, wherein the determine of the contact force is further based on a piston area of the actuator.

5. A system comprising:
an actuator fluidically coupled with a pressure-changing device, the pressure-changing device being configured to control a pressure of fluid in the actuator; and
an apparatus comprising:
one or more first processors; and
at least one first non-transitory memory coupled with the one or more first processors, the at least one first non-transitory memory storing executable instructions that when executed by the one or more first processors cause the apparatus to:
determine a contact force to apply using the actuator;
determine, based on the contact force, modified pressure to create the contact force associated with the one or more components of a haptic assembly, wherein the determine the modified pressure is based on using a mass flow rate model associated with the one or more components of the haptic assembly; and
send a message to the one or more components of the haptic assembly, wherein the message comprises instructions to change an actuator pressure to the modified pressure; and
the haptic assembly comprising:
one or more second processors; and
at least one second non-transitory memory coupled with the one or more second processors, the at least one second non-transitory memory storing executable instructions that when executed by the one or more second processors cause the haptic assembly to:
receive the message to change the actuator pressure to the modified pressure; and
adjust the actuator pressure to the modified pressure.

6. The system of claim 5, wherein the apparatus is a component of an artificial reality device.

7. The system of claim 5, wherein the determined contact force is transmitted to a display or an artificial reality device.

8. The system of claim 5, wherein the fluid comprises air.

9. The system of claim 5, wherein the determine the contact force is based on a height of the actuator or an actuator stiffness.

10. A method comprising:
receiving a pressure measurement of a fluid in an actuator;
determining, based on the pressure measurement, a mass of the fluid in the actuator;
determining a height of the actuator based on the mass of the fluid and the pressure measurement of the fluid;
determining a contact force based on the height of the actuator and the pressure measurement of the fluid; and
transmitting the contact force;
determining, based on the contact force, a modified pressure to create a second contact force associated with one or more components of a haptic assembly; and
adjusting a pressure of the actuator to the modified pressure.

11. The method of claim 10, wherein the determining the mass comprises using a mass flow rate model associated with the one or more components of the haptic assembly.

12. The method of claim 10, wherein the determining the contact force comprises using a deformation model.

13. The method of claim 10, wherein the contact force is transmitted to a display.

14. The method of claim 10, wherein the contact force is transmitted to an artificial reality device.

15. The method of claim 10, wherein the actuator comprises a pneumatic actuator.

16. The method of claim 10, wherein the actuator is part of the haptic assembly.

17. The method of claim 10, wherein:
the determining the contact force is further based on an actuator stiffness that is based on a change of pressure.

18. The method of claim 10, wherein the determining the contact force is further based on a piston area of the actuator.

19. The method of claim 10, wherein the pressure measurement is based on a comparison of a first pressure from a first pressure sensor and a second pressure of a second pressure sensor.

20. A device comprising:
one or more processors; and
at least one non-transitory memory coupled with the one or more processors, the at least one non-transitory memory storing executable instructions that when executed by the one or more processors cause the device to:
determine a contact force to apply using an actuator;
determine, based on the contact force, modified pressure to create a second contact force associated with one or more components of a haptic assembly, wherein the determine the modified pressure is based on using a mass flow rate model associated with the one or more components of the haptic assembly;
generate a message that comprises instructions to change actuator pressure to the modified pressure; and
adjust, by the haptic assembly, the actuator pressure to the modified pressure.

* * * * *